(12) United States Patent
Näslund et al.

(10) Patent No.: US 12,269,443 B2
(45) Date of Patent: Apr. 8, 2025

(54) STABILIZER LEG CONTROL SYSTEM, A VEHICLE, AND A METHOD

(71) Applicant: Hiab AB, Kista (SE)

(72) Inventors: David Näslund, Täby (SE); Lennart Andersson, Hudiksvall (SE); Joakim Karlsson, Hudiksvall (SE); Hans Königsson, Hudiksvall (SE)

(73) Assignee: Hiab AB, Kista (SE)

( * ) Notice: Subject to any disclaimer, the term of this patent is extended or adjusted under 35 U.S.C. 154(b) by 680 days.

(21) Appl. No.: 17/125,434

(22) Filed: Dec. 17, 2020

(65) Prior Publication Data

US 2021/0188221 A1 Jun. 24, 2021

(30) Foreign Application Priority Data

Dec. 20, 2019 (EP) .................................... 19218392

(51) Int. Cl.
*B60S 9/02* (2006.01)
*B66C 23/78* (2006.01)
*G08C 17/00* (2006.01)

(52) U.S. Cl.
CPC ............... *B60S 9/02* (2013.01); *B66C 23/78* (2013.01); *G08C 17/00* (2013.01); *G08C 2201/30* (2013.01)

(58) Field of Classification Search
CPC .......... B60S 9/02; B66C 23/78; B66C 13/40; G08C 17/00; G08C 2201/30
See application file for complete search history.

(56) References Cited

U.S. PATENT DOCUMENTS

| 10,611,347 B1* | 4/2020 | Archer ...................... B60S 9/12 |
| 2006/0181391 A1* | 8/2006 | McNeill ................. G05B 15/02 |
| | | 340/5.61 |

(Continued)

FOREIGN PATENT DOCUMENTS

| CN | 202512390 | 10/2012 |
| DE | 102006012471 | 9/2007 |

(Continued)

OTHER PUBLICATIONS

Extended European Search Report issued Sep. 28, 2020 for related EP Application No. 19218392.9.

*Primary Examiner* — Vivek D Koppikar
*Assistant Examiner* — Jeffrey R Chalhoub
(74) *Attorney, Agent, or Firm* — Renner, Otto, Boisselle & Sklar, LLP.

(57) ABSTRACT

A stabilizer leg control system (2) for controlling at least one stabilizer leg (4) arranged to support the stability of a vehicle (6), the control system comprises:
  a control unit (8) configured to control the operation of said at least one stabilizer leg (4),
  a user interface unit (10) comprising a user interface (12) configured to receive user input to control various functions of the vehicle, including to control the operation of said at least one stabilizer leg (4) of said vehicle, and to establish bidirectional communication to said control unit by a communication signal (14), and a receiver unit (16),
  a transmission unit (18) structured to be mounted at, or in the vicinity of, each of said at least one stabilizer leg (4), wherein said transmission unit (18) is configured to transmit a transmission unit signal (20). The user interface (12) is configured to receive a stabilizer leg activation input from a user when said at least one stabilizer leg is to be operated, and upon receipt of a (Continued)

stabilizer activation input, the user interface unit (10) is configured to generate a transmission unit activation signal (22). The transmission unit (18) is configured to be activated, and to generate said transmission unit signal (20), upon receipt of said transmission unit activation signal (22), and wherein said user interface unit (10) is configured to receive said transmission unit signal (20) by said receiver unit (16), and upon receipt of said transmission unit signal (20) the user interface unit (10) is enabled to operate the stabilizer leg related to the transmission unit (18) that generated the transmission unit signal (20).

11 Claims, 2 Drawing Sheets

(56) References Cited

U.S. PATENT DOCUMENTS

| | | | | |
|---|---|---|---|---|
| 2018/0022325 | A1* | 1/2018 | Garceau | B60S 9/02 |
| | | | | 180/41 |
| 2018/0225959 | A1* | 8/2018 | Witkowski | G07C 9/00309 |
| 2018/0322773 | A1* | 11/2018 | Brunel | G06F 3/017 |
| 2022/0112685 | A1* | 4/2022 | Saiki | E02F 9/2029 |

FOREIGN PATENT DOCUMENTS

| | | | | |
|---|---|---|---|---|
| WO | 2010028938 | | 3/2010 | |
| WO | WO-2010028938 A1 * | | 3/2010 | B66C 13/40 |

* cited by examiner

STABILIZER LEG CONTROL SYSTEM, A VEHICLE, AND A METHOD

This application claims priority to European Patent Application No. 19218392.9 filed Dec. 20, 2019, which is hereby incorporated herein by reference in its entirety.

TECHNICAL FIELD

The present disclosure relates to a stabilizer leg control system, a vehicle, and a method in relation thereto, and in particular features related to a user interface unit configured to control the operation of the stabilizer legs.

BACKGROUND

Vehicles with working equipment such as loader cranes mounted to them typically have stabilizer legs to support the stability of the vehicle when working with the equipment. The stabilizers may be an integral part of the crane or mounted directly to the vehicle itself. When working with heavy equipment such as loader cranes it is important to ensure the safety around the working area and it is important that the stabilizers are not moved by mistake during a working procedure. As an example; if a vehicle has one stabilizer leg on the left side and one of the right side, and the operator by accident moves the left instead of the right stabilizer leg it may have serious consequences.

In order to make sure that the operator does not move the stabilizers by mistake, the operator needs to verify that he or she has visual control over the area around the stabilizer to be moved before actually making the commands for moving it. Today, the verification is typically performed by pressing a button on the stabilizer leg unit. The operator may after the verification control the movements of the stabilizer leg, e.g. from an inactive transport position where the stabilizer leg is not set to ground to an active support position, where the stabilizer leg is set to support the vehicle by having contact with the ground.

The operator typically uses a remote control unit to control the movements of the stabilizer legs as well as controlling the working equipment (like a loader crane). Even though the verification by pressing the button on the stabilizer leg units ensures the safety of the working procedure, it is a tedious procedure, which stops the workflow of the operator. The current work scheme according to above is hence problematic for the operator.

Below will be discussed some documents within this technical field.

WO2010028938 describes a mobile crane having support legs that can be controlled with a remote controller. Transponders can be placed on appropriate positions such as on the support legs. A receiver on the remote controller can be used to assess the distance from the transmitter, and the remote can be inactivated if positioned outside of a predetermined zone.

US20120143445 describes a construction machine that can be controlled by a wireless remote control. One or more transmission units can be placed on the machine, and a receiver at the remote control is used to control the functionality depending on the distance between transmitter and receiver. According to one example the transmission units can be placed at a supporting leg, which would require the operator to be placed in an appropriate position in order to operate the legs.

WO9624120 describes a system for remote control of cranes and similar work equipment. A receiver at the crane is used to detect the signal strength of the remote control transmit signal and disable remote control if the signal is too low. The system can also use acoustic or optical signalling.

US20050258122 discloses a mobile crane that can be controlled by a wireless remote control and RFID transponders. According to one example, the support legs can only be operated if a transponder worn by the operator is within a safe zone near a receiver placed on the crane.

EP0514244 describes a radio-based remote controller for a travelling crane. An infrared transmitter/receiver pair is used to detect if the remote is within a specific area.

US20090033269 relates to a method for using a wireless remote control for an industrial machine having safety zones. The safety zones define areas within which operation is not allowed, and each zone is defined with an RFID transponder having its own identity.

The object of the invention is to improve the safety when controlling the movements of the stabilizer legs with a remote user interface unit, and doing so by supporting the user in the workflow rather than adding a distracting verification step.

SUMMARY

The above-mentioned object is achieved by the present invention according to the independent claims.

Preferred embodiments are set forth in the dependent claims.

According to a first aspect, the invention relates to a stabilizer leg control system (2) for controlling at least one stabilizer leg (4) arranged to support the stability of a vehicle (6). The control system comprises a control unit (8) configured to control the operation of said at least one stabilizer leg (4); a user interface unit (10) comprising a user interface (12) configured to receive user input to control various functions of the vehicle, including to control the operation of said at least one stabilizer leg (4) of said vehicle, and to establish bidirectional communication to said control unit by a communication signal (14), and a receiver unit (16), and to at least one transmission unit (18) structured to be mounted at, or in the vicinity of, each of said at least one stabilizer leg (4), wherein said transmission unit (18) is configured to transmit a transmission unit signal (20). The user interface (12) is configured to receive a stabilizer leg activation input from a user when said at least one stabilizer leg is to be operated, and upon receipt of a stabilizer activation input, the user interface unit (10) is configured to generate a transmission unit activation signal (22), wherein said transmission unit (18) is configured to be activated, and to generate said transmission unit signal (18), upon direct or indirect receipt of said transmission unit activation signal (22), and wherein said user interface unit (10) is configured to receive said transmission unit signal (20) by said receiver unit (16), and upon receipt of said transmission unit signal (20) the user interface unit (10) is enabled to operate the stabilizer leg related to the transmission unit (18) that generated the transmission unit signal (20). By implementing the stabilizer leg control system the safety is improved by requiring that the user interface unit, and thereby also the user, is in the vicinity of the stabilizer leg to be controlled, and at the same time that distracting verification steps are avoided. Other advantages achieved by the system are that the signal transmission will be activated only when the stabilizer legs are to be moved/controlled using the user interface unit. This will save power to the transmission units which may be powered by batteries.

According to one embodiment, the control unit (8) is configured to receive the transmission unit activation signal (22), and upon receipt of said signal activate said transmission unit (18).

According to another embodiment, the transmission unit signal (20) comprises identification data uniquely identifying the stabilizer leg (4) where the transmission unit (18) is mounted. The user interface unit (10) is configured to send received identification data to said control unit (8) that is configured to compare received identification data to stored identification data of the activated transmission unit (18) that transmitted the transmission unit signal (20), and to generate an enabling signal (24) to the user interface unit (10) if the received identification data corresponds to the stored identification data. This is advantageous in that the identity of the stabilizer leg to be controlled must first be verified before the user interface unit is enabled to control the stabilizer leg. This increases the safety of the system, if more than one vehicle with the same system is operated in the same area.

According to still another embodiment, the user interface (12) is provided with several input menus, each corresponding to various functions of the vehicle. One input menu, a stabilizer leg menu, is designated to receive user input for controlling the at least one stabilizer leg. A stabilizer activation input is considered received when the user enters said menu for controlling the at least one stabilizer leg. This features also improves the user-friendliness of the system in that the transmission unit(s) are automatically activated when the user enters the stabilizer leg menu.

In still a further embodiment, the stabilizer leg menu is configured to control the stabilizer leg related to the transmission unit (18) that generated a received transmission unit signal (20). This is advantageous in that the user does not need to manually provide information which stabilizer leg is to be operated.

According to a second aspect the invention relates to a vehicle (6) comprising at least one stabilizer leg (4) arranged to support the stability of the vehicle, wherein the vehicle comprises a stabilizer leg control system as described herein.

According to a third aspect the invention relates to a method for a stabilizer leg control system (2) for controlling at least one stabilizer leg (4) arranged to support the stability of a vehicle (6), the control system comprises a control unit (8), a user interface unit (10) comprising a user interface (12), a transmission unit (18) which have been described herein.

The method comprises:
receiving, by said user interface (12), a stabilizer leg activation input from a user when said at least one stabilizer leg is to be operated,
upon receipt of a stabilizer activation input, generating a transmission unit activation signal (22),
upon receipt of said transmission unit activation signal (22), activating said transmission unit,
generating, by said transmission unit, said transmission unit signal (18),
receiving, by said receiver unit (16), said transmission unit signal (20), and
upon receipt of said transmission unit signal (20), enabling the user interface unit (10) to operate the stabilizer leg related to the transmission unit (18) that generated the transmission unit signal (20).

By implementing the method for the stabilizer leg control system the safety is improved by requiring that the user interface unit, and thereby also the user is in the vicinity of the stabilizer leg to be controlled, and at the same time that distracting verification steps are avoided.

According to one embodiment the transmission unit signal (20) comprises identification data uniquely identifying the stabilizer leg (4) where the transmission unit (18) is mounted. The method comprises:
sending, by said user interface unit (10), said received identification data to said control unit (8),
comparing said received identification data to stored identification data of the activated transmission unit (18) that transmitted the transmission unit signal (20), and
generating an enabling signal (24) to said user interface unit (10) if the received identification data corresponds to the stored identification data.

This is advantageous in that the identity of the stabilizer leg to be controlled must first be verified before the user interface unit is enabled to control the stabilizer leg.

According to another embodiment, the user interface (12) is provided with several input menus, each corresponding to various functions of the vehicle, wherein one input menu, a stabilizer leg menu, is designated to receive user input for controlling the at least one stabilizer leg, and wherein a stabilizer activation input is considered received when the user enters said menu for controlling the at least one stabilizer leg. These features improve the user-friendliness of the system in that the transmission unit(s) are automatically activated when the user enters the stabilizer leg menu. Preferably, the method comprises controlling, by the stabilizer leg menu, the stabilizer leg related to the transmission unit (18) that generated a received transmission unit signal (20). This is advantageous in that the user does not need to manually provide information which stabilizer leg is to be operated.

Thus, the transmission of signals from the at least one transmission unit may be activated in response to the user activating the option of controlling the stabilizer legs on the user interface unit. This will have also the advantage of saving energy and further to not generate signal noise.

DETAILED DESCRIPTION

The stabilizer leg control system, the vehicle, and the method, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
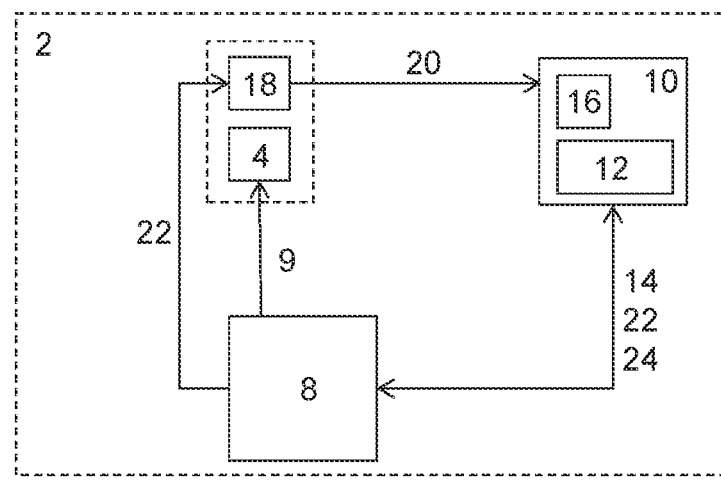
FIG. 1 is a block diagram schematically illustrating the present invention.

With references to FIGS. 1 and 2 the stabilizer leg control system 2 for controlling at least one stabilizer leg 4 arranged to support the stability of a vehicle 6 will be described. In the illustrated vehicle in FIG. 2, two stabilizer legs 4 are shown, one on each side of the vehicle. The vehicle is provided with a working equipment 5, e.g. a crane.

The control system comprises a control unit 8 configured to control the operation of the at least one stabilizer leg 4 by generating a control signal 9 to be applied to the stabilizer leg(s) to be controlled. The control system is further provided with a user interface unit 10, e.g. a remote controller, comprising a user interface 12 configured to receive user input to control various functions of the vehicle, including to control the operation of the at least one stabilizer leg 4 of the vehicle. Preferably, the user interface is provided with a graphical user interface, e.g. a touch screen, or a display, and input members, e.g. physical buttons and/or levers, to receive user input, e.g. to control menus visible on the display. The user interface unit is also configured to establish bidirectional wireless communication to the control unit by a communication signal 14. The user interface unit also comprises a receiver unit 16.

The control system further comprises at least one transmission unit 18, each structured to be mounted at, or in the vicinity of, each of the at least one stabilizer leg 4, and that the transmission unit 18 is configured to transmit a transmission unit signal 20, which is a wireless signal, and preferably an electromagnetic signal, e.g. as an optical signal in the infrared part of the spectrum, which is advantageous as the direction of infrared signals easily may be controlled to have a specific coverage that in this case may be e.g. approx. 180 degrees and thus cover one side of the vehicle. The transmission unit is mounted on the stabilizer leg, or on the vehicle, so that the transmitted transmission unit signal covers an area in the neighborhood of a stabilizer leg. As an example, which is illustrated in FIG. 2, a truck with a loader crane that has two stabilizers, mounted on each side of the vehicle, may have two transmission units; one mounted on the left side of the vehicle and one on the right side of the vehicle. The transmission unit may e.g. comprise a number of LEDs mounted so that the signal is transmitted in a broad angle facing outwards from the longitudinal side of the vehicle, see FIG. 2. The transmission unit is powered by the working equipment or the vehicle, alternatively it may be powered by a battery.

The user interface 12 is configured to receive a stabilizer leg activation input from a user 7 when the at least one stabilizer leg is to be operated, and upon receipt of a stabilizer activation input, the user interface unit 10 is configured to generate a transmission unit activation signal 22. The transmission unit 18 is configured to be activated, and to generate the transmission unit signal 20, upon receipt of the transmission unit activation signal 22. In the embodiment illustrated in FIG. 2 only one of the transmission units are activated upon receipt of a transmission unit activation signal. It is naturally also possible to activate all, in this case both, transmission units, or a subset of the transmission units, e.g. those on one side of the vehicle. Preferably, the transmission units) will be activated as long as the stabilizer legs) is/are operated.

Then, the user interface unit 10 is configured to receive the transmission unit signal 20 by the receiver unit 16, and upon receipt of the transmission unit signal 20, the user interface unit 10 is enabled to operate the stabilizer leg related to the transmission unit 18 that generated the transmission unit signal 20.

In one embodiment, the control unit 8 is configured to receive the transmission unit activation signal 22, and upon receipt of the signal, activate the transmission unit 18. I.e. the transmission unit is indirectly activated. The activation may e.g. be by supplying electrical power to the transmission unit, or by wirelessly activating the transmission unit. In an alternative variation the transmission unit activation signal is sent directly to the transmission unit that is configured to receive the signal, set itself into an active mode of operation from a passive low-energy-consumption mode, and generate the transmission unit signal 20.

According to one embodiment, the transmission unit signal 20 comprises identification data uniquely identifying the stabilizer leg 4 where the transmission unit 18 is mounted. The user interface unit 10 is configured to send received identification data to the control unit S that is configured to compare received identification data to stored identification data of the activated transmission unit 18 that transmitted the transmission unit signal 20. As a result of the comparison, the control unit is configured to generate an enabling signal 24 to the user interface unit 10 if the received identification data corresponds to the stored identification data. Receipt of the enabling signal 24 enables the user interface unit 10 to control the stabilizer leg 4 related to the transmission unit identified by the identification data.

According to another embodiment, the transmission unit signal 20 comprises identification data uniquely identifying the stabilizer leg 4 where the transmission unit 18 is mounted. The user interface unit 10 is then enabled to operate the at least one stabilizer leg 4 only if the received identification data relate to a stabilizer leg intended to be controlled, which is determined by determining if the user interface unit 10 is within a transmission sector 26 of the identified stabilizer leg 4. The transmission sector 26 is schematically illustrated in FIG. 2. The transmission sector defines the maximum allowable distance between the transmission unit 18 and the user interface unit 10, for the user interface unit 10 to be allowed to control the stabilizer leg associated with the transmission unit 18.

As mentioned above the user interface 12 is provided with a graphical user interface and is provided with several input menus, each corresponding to various functions of the vehicle. The different menus may be designated to different operating modes, where one operating mode is for operating the stabilizer legs. Thus, one input menu is related to control the stabilizer legs, denoted a stabilizer leg menu, and is designated to receive user input for controlling the at least one stabilizer leg. A stabilizer activation input is considered received when the user enters the stabilizer leg menu for controlling the at least one stabilizer leg. Preferably, the stabilizer leg menu is configured to control the stabilizer leg related to the transmission unit 18 that generated a received transmission unit signal 20. In other words, the user interface is automatically set to control the stabilizer leg being identified by the receipt of the transmission unit signal from the activated transmission unit related to the stabilizer leg. The user than has a confirmed view of the stabilizer leg to be controlled. Short interruptions where no receipt of the transmission unit signal is made may be allowed without cancelling the control of the stabilizer leg. This short interruption may be e.g. 2-3 seconds at a maximum.

In one exemplary implementation, if two stabilizer legs are mounted to the same side of the vehicle then it would be possible that these two stabilizer legs could be selectable and controlled via the user interface.

The present invention also relates to a vehicle 6 comprising at least one stabilizer leg 4 arranged to support the stability of the vehicle, and that the vehicle comprises a stabilizer leg control system 2 as described above. The vehicle may be any type of vehicle provided with at least one stabilizer leg.

Figure 3:
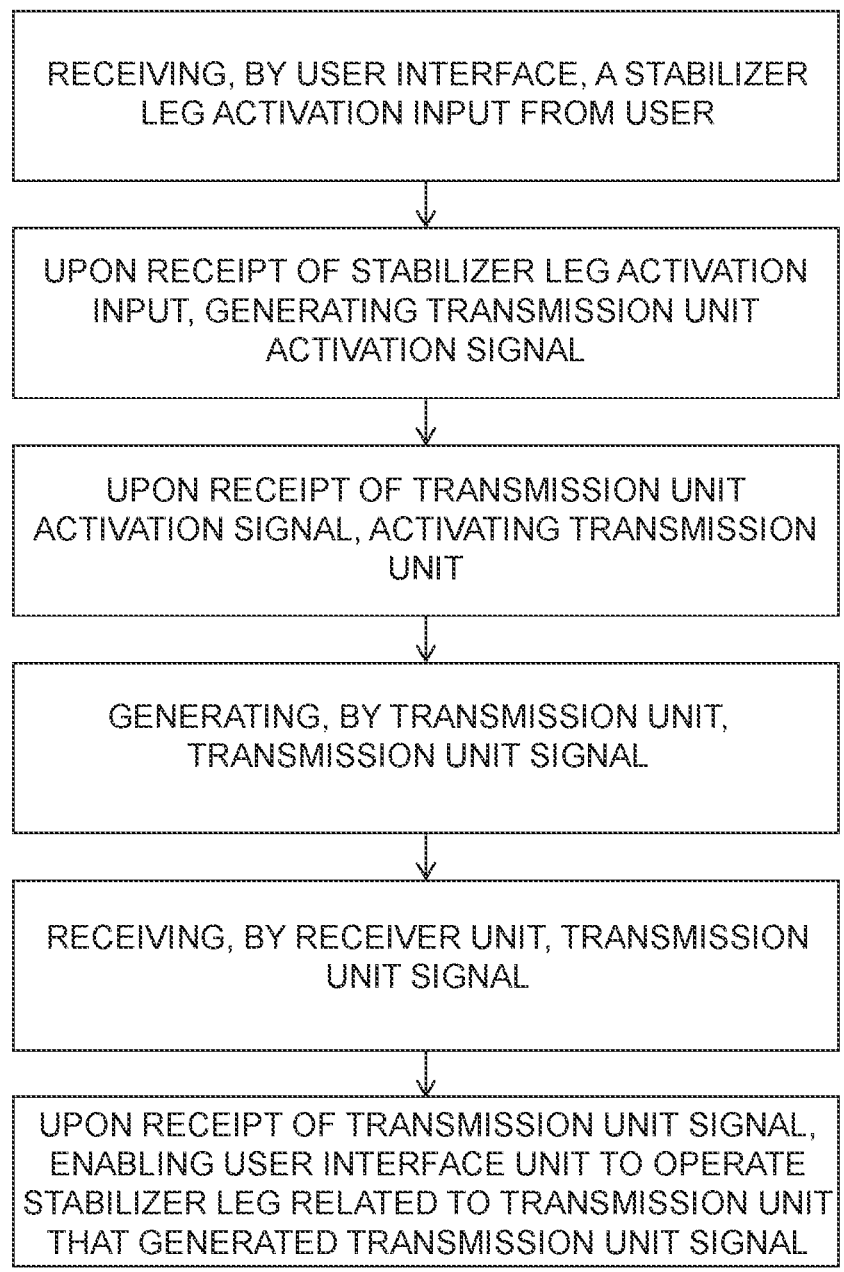
FIG. 3 is a flow diagram illustrating the method according to the present invention.

The present invention also relates to a method for a stabilizer leg control system 2 for controlling at least one stabilizer leg 4 arranged to support the stability of a vehicle 6. The control system has been described in detail above and it is herein referred to that description. The method will be described with references to the flow diagram shown in FIG. 3. Thus, the control system comprises: a control unit 8 configured to control the operation of the at least one stabilizer leg 4, a user interface unit 10 comprising a user interface 12 configured to receive user input to control various functions of the vehicle, including to control the operation of the at least one stabilizer leg 4 of the vehicle; and to establish bidirectional communication to the control unit by a communication signal 14. The user interface unit 10 also comprises a receiver unit 16. The stabilizer leg control system also comprises a transmission unit 18 structured to be mounted at, or in the vicinity of, each of the at least one stabilizer leg 4, wherein the transmission unit 18 is configured to transmit a transmission unit signal 20.

The method comprises:
  receiving, by the user interface 12, a stabilizer leg activation input from a user when the at least one stabilizer leg is to be operated;
  upon receipt of a stabilizer activation input, generating a transmission unit activation signal 22;
  upon receipt of the transmission unit activation signal 22, activating the transmission unit;
  generating, by the transmission unit 18, the transmission unit signal 20;
  receiving, by the receiver unit 16, the transmission unit signal 20, and
  upon receipt of the transmission unit signal 20, enabling the user interface unit 10 to operate the stabilizer leg related to the transmission unit 18 that generated the transmission unit signal 20.

In one embodiment, the method comprises receiving, by the control unit 8, the transmission unit activation signal 22, and upon receipt of the signal, activating the transmission unit 18. E.g. by supplying electrical energy to the transmission unit.

In a further embodiment, the transmission unit signal 20 comprises identification data uniquely identifying the stabilizer leg 4 where the transmission unit 18 is mounted, and the method comprises:
  sending, by the user interface unit 10, the received identification data to the control unit 8;
  comparing the received identification data to stored identification data of the activated transmission unit 18 that transmitted the transmission unit signal 20, and
  generating an enabling signal 24 to the user interface unit 10 if the received identification data corresponds to the stored identification data.

Figure 2:
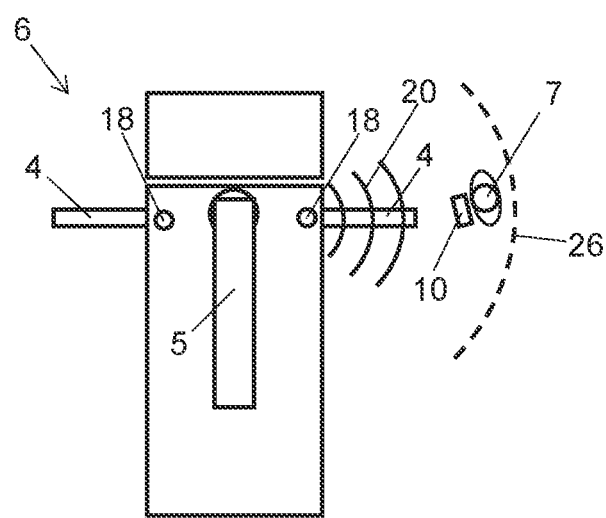
FIG. 2 is a schematic illustration from above of a vehicle provided with a stabilizer leg control system according to the present invention.

In another embodiment, the transmission unit signal 20 comprises identification data uniquely identifying the stabilizer leg 4 where the transmission unit 18 is mounted, and that the method comprises:
  enabling the user interface unit 10 to operate the at least one stabilizer leg 4 only if the received identification data relates to a stabilizer leg intended to be controlled, which is determined by determining if the user interface unit 18 is within a transmission sector 26 of the identified stabilizer leg 4 (see FIG. 2).

According to another embodiment of the method, the user interface 12 is provided with several input menus, each corresponding to various functions of the vehicle. One of those input menus, a stabilizer leg menu, is designated to receive user input for controlling the at least one stabilizer leg, and a stabilizer activation input is considered received when the user enters said menu for controlling the at least one stabilizer leg. Preferably, the method comprises controlling, by the stabilizer leg menu, the stabilizer leg related to the transmission unit 18 that generated a received transmission unit signal 20.

In one variation of the control system, unique identification data is coded in the transmission signal, and by transmitting the signal in a series of pulses with decreasing amplitude levels and comparing the received signal amplitude to a predetermined threshold at the receiver unit, the distance from the transmission unit may be estimated by the number of pules in a series of pulses that is detected with a signal amplitude being above the predetermined threshold by the receiver unit at the user interface unit. The receiver unit included in the user interface unit is adapted to receive the signals from the transmission units. The user interface unit may further comprise signal processing capabilities for analyzing the received signals to e.g. extract the unique identification data from the signal and further to count the number of pulses detected in a series of pulses.

The identity of the stabilizer leg, vehicle, and/or side of the vehicle may be deduced from the identification data in the signal to verify that that the user interface unit is in the neighbourhood of the stabilizer leg that it is about to control. The identification data may e.g. be mapped to a particular stabilizer leg and the vehicle in a table in the control unit. In this way the system may ensure that the signal is received from the right vehicle and further identify which stabilizer leg unit on the vehicle. The number of detected pulses in a series of pulses is one way of estimating the distance from the user interface unit to the transmission unit.

The number of pules may be directly compared to a predetermined threshold corresponding to a safe distance, or may first be converted to a distance that is compared to a predetermined distance threshold. The system may hence determine that the user interface unit is close enough so that the user can make sure that the stabilizer is controlled in a safe way.

The analysis of the identification data and distance from the transmission unit may be performed at the user interface unit or at the control unit of the vehicle/working equipment. The user interface unit would in the latter case then transmit the information from the received signal or the signal itself to the control unit of the vehicle/working equipment. This may be transmitted using the present protocols for communication between the user interface unit and the vehicle/working equipment.

In one embodiment the transmitter units are activated by the control unit. The activation is performed in response to the control unit receives signals from the user interface unit indicating that the operator of the vehicle or working equipment is interested in controlling the stabilizer leg. This may for example be based on a user input on the user interface of the user interface unit specifying that the operator is entering a menu in the user interface of the user interface unit for controlling the stabilizer legs.

When the transmission units have been activated the user interface unit and/or the control unit may verify which transmission unit on the vehicle/working unit that the user interface unit is intended to control and/or is within a safe distance of. This may then be communicated to the user before the user even attempts to control the stabilizer legs by e.g. graphics in the user interface of the user interface unit. If the user tries to control a stabilizer leg which is not within a safe distance further tactile, audio or visual signals may be generated using the user interface unit. This would improve aid the user in the workflow and provide improved user friendliness of the system.

If further signal transmission units are added to the vehicle the relative position of the user interface unit may further be deduced by the system. The position of the user interface unit may further be used and combined with other systems to ensure the safety around the user holding the user interface unit by defining a volume around the operator where e.g. the crane cannot be moved.

The control unit may be realized by one or many units connected to each other by a communication bus system, e.g. a CAN system. It is provided with all necessary processing capabilities to perform all various functions required to operate the vehicle and working equipment.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A stabilizer leg control system for controlling first and second stabilizer legs arranged to support the stability of a vehicle, the control system comprising:
    a controller configured to control the operation of said first and second stabilizer legs,
    a remote controller comprising a user interface configured to receive user input to control various functions of the vehicle, and to establish bidirectional communication to said controller by a communication signal, and a receiver unit, wherein said user interface is provided with several input menus, each corresponding to various functions of the vehicle, wherein the several input menus includes a stabilizer leg menu that is configured to receive user input for controlling the operation of the first and second stabilizer legs,
    first and second wireless transmitters structured to be mounted at, or in the vicinity of, the respective first and second stabilizer legs, wherein each of said first and second wireless transmitters is configured to transmit a transmission unit signal,
    wherein said stabilizer leg menu of said user interface is configured to receive a stabilizer leg activation input from a user when a selected one of said first and second stabilizer legs is to be operated,
    and wherein upon receipt of the stabilizer leg activation input, the remote controller is configured to generate a transmission unit activation signal, wherein the stabilizer leg activation input is considered received when the user enters said stabilizer leg menu for controlling the first or second stabilizer legs such that the first and second wireless transmitters are automatically activated when the user enters said stabilizer leg menu, wherein said automatic activation of the first and second wireless transmitters fulfills a first criterion (1) for the selected one of the first and second stabilizer legs to be controlled,
    wherein each of said first and second wireless transmitters is configured to be activated, and to generate said transmission unit signal, upon direct or indirect receipt of said transmission unit activation signal, and
    wherein said remote controller is configured to receive by said receiver unit said transmission unit signal from the first or second wireless transmitter corresponding to the selected one of said first and second stabilizer legs, and upon receipt of said transmission unit signal,
        the remote controller is enabled to operate the selected one of the first and second stabilizer legs only if the first criterion (1) is fulfilled and a second criterion (2) is fulfilled, the second criterion (2) being fulfilled only if both a first condition (2a) is met in which the transmission unit signal received is specific to the selected stabilizer leg, and a second condition (2b) is met in which the remote controller is within the wireless transmission sector for that stabilizer leg, according to the following:
        if the transmission unit signal relates to the first stabilizer leg being the selected one of said first and second stabilizer legs and the remote controller is within a first transmission sector of the first wireless transmitter, the remote controller is enabled to operate the first stabilizer leg, wherein the first transmission sector defines the maximum allowable distance between the first wireless transmitter and the remote controller for the remote controller to be allowed to control the first stabilizer leg; and
        if the transmission unit signal relates to the second stabilizer leg being the selected one of said first and second stabilizer legs and the remote controller is within a second transmission sector of the second wireless transmitter, the remote controller is enabled to operate the second stabilizer leg, wherein the second transmission sector defines the maximum allowable distance between the second wireless transmitter and the remote controller for the remote controller to be allowed to control the second stabilizer leg;
        wherein the first transmission sector does not overlap with the second transmission sector such that the first and second transmission sectors are distinct for the respective first and second stabilizer legs;
    wherein said transmission unit signal comprises identification data uniquely identifying the first or second stabilizer leg where the respective first or second wireless transmitter that transmitted the transmission unit signal is mounted, and wherein said remote controller is configured to send received identification data to said controller that is configured to compare received identification data to stored identification data of the activated first or second wireless transmitter that transmitted the transmission unit signal, and to generate an enabling signal to said remote controller if the received identification data corresponds to the stored identification data, resulting in an identification-based targeted control of the specific stabilizer leg selected by the user.

2. The stabilizer leg control system according to claim 1, wherein said controller is configured to receive said transmission unit activation signal, and upon receipt of said transmission unit activation signal activate said first or second wireless transmitter corresponding to the selected one of said first and second stabilizer legs.

3. The stabilizer leg control system according to claim 1, wherein said transmission unit signal comprises identification data uniquely identifying the first or second stabilizer leg where the respective first or second wireless transmitter that transmitted the transmission unit signal is mounted, and wherein said remote controller is enabled to operate said first or second stabilizer leg where the respective first or second wireless transmitter that transmitted the transmission unit signal is mounted only if the received identification data relate to the selected one of said first and second stabilizer legs intended to be controlled, which is determined by determining if said remote controller is within the respective first or second transmission sector of the identified first or second stabilizer leg.

4. The stabilizer leg control system according to claim 1, wherein said stabilizer leg menu is configured to control the first or second stabilizer leg related to the first or second wireless transmitter that generated the transmission unit signal received by the remote controller.

5. A vehicle comprising:
first and second stabilizer legs arranged to support the stability of the vehicle,
a stabilizer leg control system for controlling the first and second stabilizer legs, the control system comprising:
a controller configured to control the operation of said first and second stabilizer legs,
a remote controller comprising a user interface configured to receive user input to control various functions of the vehicle, and to establish bidirectional communication to said controller by a communication signal, and a receiver unit, wherein said user interface is provided with several input menus, each corresponding to various functions of the vehicle, wherein the several input menus includes a stabilizer leg menu that is configured to receive user input for controlling the operation of the first and second stabilizer legs,
first and second wireless transmitters structured to be mounted at, or in the vicinity of, the respective first and second stabilizer legs, wherein each of said first and second wireless transmitters is configured to transmit a transmission unit signal,
wherein said stabilizer leg menu of said user interface is configured to receive a stabilizer leg activation input from a user when a selected one of said first and second stabilizer legs is to be operated,
and wherein upon receipt of the stabilizer leg activation input, the remote controller is configured to generate a transmission unit activation signal, wherein the stabilizer leg activation input is considered received when the user enters said stabilizer leg menu for controlling the first or second stabilizer legs such that the first and second wireless transmitters are automatically activated when the user enters said stabilizer leg menu, wherein said automatic activation of the first and second wireless transmitters fulfills a first criterion (1) for the selected one of the first and second stabilizer legs to be controlled,
wherein each of said first and second wireless transmitters is configured to be activated, and to generate said transmission unit signal, upon direct or indirect receipt of said transmission unit activation signal, and
wherein said remote controller is configured to receive by said receiver unit said transmission unit signal from the first or second wireless transmitter corresponding to the selected one of said first and second stabilizer legs, and upon receipt of said transmission unit signal,
the remote controller is enabled to operate the selected one of the first and second stabilizer legs only if the first criterion (1) is fulfilled and a second criterion (2) is fulfilled, the second criterion (2) being fulfilled only if both a first condition (2a) is met in which the transmission unit signal received is specific to the selected stabilizer leg, and a second condition (2b) is met in which the remote controller is within the wireless transmission sector for that stabilizer leg, according to the following:
if the transmission unit signal relates to the first stabilizer leg being the selected one of said first and second stabilizer legs and the remote controller is within a first transmission sector of the first wireless transmitter, the remote controller is enabled to operate the first stabilizer leg, wherein the first transmission sector defines the maximum allowable distance between the first wireless transmitter and the remote controller for the remote controller to be allowed to control the first stabilizer leg; and
if the transmission unit signal relates to the second stabilizer leg being the selected one of said first and second stabilizer legs and the remote controller is within a second transmission sector of the second wireless transmitter, the remote controller is enabled to operate the second stabilizer leg, wherein the second transmission sector defines the maximum allowable distance between the second wireless transmitter and the remote controller for the remote controller to be allowed to control the second stabilizer leg;
wherein the first transmission sector does not overlap with the second transmission sector such that the first and second transmission sectors are distinct for the respective first and second stabilizer legs;
wherein said transmission unit signal comprises identification data uniquely identifying the first or second stabilizer leg where the respective first or second wireless transmitter that transmitted the transmission unit signal is mounted, and wherein said remote controller is configured to send received identification data to said controller that is configured to compare received identification data to stored identification data of the activated first or second wireless transmitter that transmitted the transmission unit signal, and to generate an enabling signal to said remote controller if the received identification data corresponds to the stored identification data, resulting in an identification-based targeted control of the specific stabilizer leg selected by the user.

6. A method for a stabilizer leg control system for controlling first and second stabilizer legs arranged to support the stability of a vehicle, the control system comprising:
a controller configured to control the operation of said first and second stabilizer legs,
a remote controller comprising a user interface configured to receive user input to control various functions of the vehicle, and to establish bidirectional communication to said controller by a communication signal, and a receiver unit, wherein said user interface is provided with several input menus, each corresponding to various functions of the vehicle, wherein the several input menus includes a stabilizer leg menu that is configured to receive user input for controlling the operation of the first and second stabilizer legs,
first and second wireless transmitters structured to be mounted at, or in the vicinity of, the respective first and second stabilizer legs, wherein each of said first and second wireless transmitters is configured to transmit a transmission unit signal,
wherein said method comprises:
receiving, by said stabilizer leg menu of said user interface, a stabilizer leg activation input from a user when a selected one of said first and second stabilizer legs is to be operated,
upon receipt of the stabilizer leg activation input, generating a transmission unit activation signal, wherein the stabilizer leg activation input is considered received when the user enters said stabilizer leg menu for controlling the first or second stabilizer legs such that the first and second wireless transmitters are automatically activated when the user enters said stabilizer leg menu, wherein said automatic activation of the first and second wireless transmitters fulfills a first criterion (1) for the selected one of the first and second stabilizer legs to be controlled, upon receipt of said transmission unit activation signal, activating said first or second wireless transmitter corresponding to the selected one of said first and second stabilizer legs, generating, by said first or second wireless transmitter corresponding to the selected one of said first and second stabilizer legs, said transmission unit signal, receiving, by said receiver unit, said transmission unit signal, and upon receipt by said receiver unit of said transmission unit signal from the first or second wireless transmitter corresponding to the selected one of said first and second stabilizer legs, the remote controller is enabled to operate the selected one of the first and second stabilizer legs only if the first criterion (1) is fulfilled and a second criterion (2) is fulfilled, the second criterion (2) being fulfilled only if both a first condition (2a) is met in which the transmission unit signal received is specific to the selected stabilizer leg, and a second condition (2b) is met in which the remote controller is within the wireless transmission sector for that stabilizer leg, according to the following:

if the transmission unit signal relates to the first stabilizer leg being the selected one of said first and second stabilizer legs and the remote controller is within a first transmission sector of the first wireless transmitter, enabling the remote controller to operate the first stabilizer leg, wherein the first transmission sector defines the maximum allowable distance between the first wireless transmitter and the remote controller for the remote controller to be allowed to control the first stabilizer leg; and if the transmission unit signal relates to the second stabilizer leg being the selected one of said first and second stabilizer legs and the remote controller is within a second transmission sector of the second wireless transmitter, enabling the remote controller to operate the second stabilizer leg, wherein the second transmission sector defines the maximum allowable distance between the second wireless transmitter and the remote controller for the remote controller to be allowed to control the second stabilizer leg;

wherein the first transmission sector does not overlap with the second transmission sector such that the first and second transmission sectors are distinct for the respective first and second stabilizer legs;

wherein said transmission unit signal comprises identification data uniquely identifying the first or second stabilizer leg where the respective first or second wireless transmitter that transmitted the transmission unit signal is mounted, and wherein the method comprises:

sending, by said remote controller, said received identification data to said controller, comparing said received identification data to stored identification data of the activated first or second wireless transmitter that transmitted the transmission unit signal, and generating an enabling signal to said remote controller if the received identification data corresponds to the stored identification data, resulting in an identification-based targeted control of the specific stabilizer leg selected by the user.

7. The method according to claim 6, comprising receiving, by said controller, said transmission unit activation signal, and upon receipt of said transmission unit activation signal activating said first or second wireless transmitter corresponding to the selected one of said first and second stabilizer legs.

8. The method according to claim 6, wherein said transmission unit signal comprises identification data uniquely identifying the first or second stabilizer leg where the respective first or second wireless transmitter that transmitted the transmission unit signal is mounted, and wherein the method comprises:

enabling said remote controller to operate said first or second stabilizer leg where the respective first or second wireless transmitter that transmitted the transmission unit signal is mounted only if the received identification data relate to the selected one of said first and second stabilizer legs intended to be controlled, which is determined by determining if said remote controller is within the respective first or second transmission sector of the identified first or second stabilizer leg.

9. The method according to claim 6, comprising controlling, by said stabilizer leg menu, the first or second stabilizer leg related to the first or second wireless transmitter that generated the transmission unit signal received by the remote controller.

10. The stabilizer leg control system according to claim 1, wherein said controller is configured to receive said transmission unit activation signal, and upon receipt of said transmission unit activation signal activate both of said first and second wireless transmitters.

11. The method according to claim 6, comprising receiving, by said controller, said transmission unit activation signal, and upon receipt of said transmission unit activation signal activating activate both of said first and second wireless transmitters.

* * * * *